(12) United States Patent
Sangster et al.

(10) Patent No.: US 9,363,253 B2
(45) Date of Patent: Jun. 7, 2016

(54) SYSTEMS AND METHODS FOR PAIRING BLUETOOTH DEVICES

(71) Applicant: Microsoft Technology Licensing, LLC, Redmond, WA (US)

(72) Inventors: Daniel M. Sangster, Bellevue, WA (US); Christopher Mark Dreher, Seattle, WA (US); Joseph Kagume Ngari, Seattle, WA (US); Carlos Manzanedo, Kirkland, WA (US); James Charles Marshall, Puyallup, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/458,675

(22) Filed: Aug. 13, 2014

(65) Prior Publication Data
US 2014/0351901 A1 Nov. 27, 2014

Related U.S. Application Data

(63) Continuation of application No. 13/486,251, filed on Jun. 1, 2012, now Pat. No. 8,838,073, which is a continuation of application No. 11/732,980, filed on Apr. 5, 2007, now Pat. No. 8,213,908.

(51) Int. Cl.
*H04W 12/06* (2009.01)
*H04L 29/06* (2006.01)
*G06F 3/023* (2006.01)
*G06F 3/038* (2013.01)
*H04W 99/00* (2009.01)
(Continued)

(52) U.S. Cl.
CPC ............. *H04L 63/08* (2013.01); *G06F 3/0231* (2013.01); *G06F 3/038* (2013.01); *H04W 12/06* (2013.01); *H04W 99/00* (2013.01); *G06F 2203/0384* (2013.01); *H04W 76/02* (2013.01); *H04W 84/18* (2013.01)

(58) Field of Classification Search
CPC ..... H04W 12/06; H04W 84/18; H04W 99/00; H04W 76/02; H04L 63/08
USPC .......................... 455/410, 411, 414.1, 414.4
See application file for complete search history.

(56) References Cited

U.S. PATENT DOCUMENTS 6,845,097 B2 1/2005 Haller et al.
7,130,584 B2 10/2006 Hirvonen
(Continued)

FOREIGN PATENT DOCUMENTS

GB 2411754 A 9/2005
WO WO 03071703 A1 8/2003

OTHER PUBLICATIONS

Broadcom First in Industry to Enable Bluetooth Keyboard and Mouse as Standard Peripherals Package for Desktop PCs, Jun. 2004, 3 pages.
(Continued)

*Primary Examiner* — Sam Bhattacharya
(74) *Attorney, Agent, or Firm* — Qudus Olaniran; Micky Minhas

(57) ABSTRACT

Embodiments of software-supervised pairing processes are provided. The processes enable a user to pair a mouse and keyboard with a Bluetooth transceiver without having to use a second mouse and keyboard. At least two separate processes are provided, including a long transition for initial pairing or re-pairing and a short transition for re-establishing a connection after devices have already been paired.

20 Claims, 6 Drawing Sheets

(51) Int. Cl.
*H04W 76/02* (2009.01)
*H04W 84/18* (2009.01)

(56) References Cited

U.S. PATENT DOCUMENTS

| | | | |
|---|---|---|---|
| 7,165,171 | B2 | 1/2007 | Zhang et al. |
| 7,305,511 | B2 | 12/2007 | Barrett et al. |
| 8,213,908 | B2 | 7/2012 | Sangster et al. |
| 8,838,073 | B2 | 9/2014 | Sangster et al. |
| 2002/0077764 | A1 | 6/2002 | Milios et al. |
| 2003/0169734 | A1 | 9/2003 | Lu et al. |
| 2003/0172271 | A1 | 9/2003 | Silvester |
| 2004/0044913 | A1 | 3/2004 | Wu |
| 2004/0177132 | A1 | 9/2004 | Zhang et al. |
| 2005/0152294 | A1 | 7/2005 | Yu et al. |
| 2006/0061482 | A1 | 3/2006 | Monney et al. |
| 2006/0068760 | A1 | 3/2006 | Hameed et al. |
| 2006/0105712 | A1 | 5/2006 | Glass et al. |
| 2007/0130371 | A1 | 6/2007 | Chung et al. |
| 2007/0255827 | A1 | 11/2007 | Aull et al. |
| 2008/0134281 | A1 | 6/2008 | Shinde et al. |

OTHER PUBLICATIONS

Bluetooth Wireless Technology, 3 pages. Printed as early as Feb. 19, 2007.

Prosecution History from U.S. Appl. No. 11/732,980, including: Issue Notification mailed Jun. 13, 2012, Notice of Allowance mailed Mar. 1, 2012, Response to Restriction Requirement dated Jan. 11, 2012, Requirement for Restriction dated Dec. 13, 2011, Amendment with RCE dated Aug. 23, 2011, Final Office Action dated May 23, 2011, Amendment dated Mar. 23, 2011. Part 1 of 2.

Prosecution History from U.S. Appl. No. 11/732,980, including: Non-Final Office Action dated Feb. 28, 2011, Amendment with RCE dated Dec. 1. 2010, Final Office Action dated Sep. 1, 2010, Amendment dated Jun. 18, 2010, Non-Final Office Action dated Mar. 18, 2010, and Application filed Apr. 5, 2007. 122 pages. Part 2 of 2.

Prosecution History from U.S. Appl. No. 13/486,251, including: Issue Notification mailed Aug. 27, 2014, Notice of Allowance mailed May 14, 2014, Amendment dated Jan. 9, 2014, Non-Final Office Action dated Oct. 15, 2013, and Application filed Jun. 1, 2012. 50 pages.

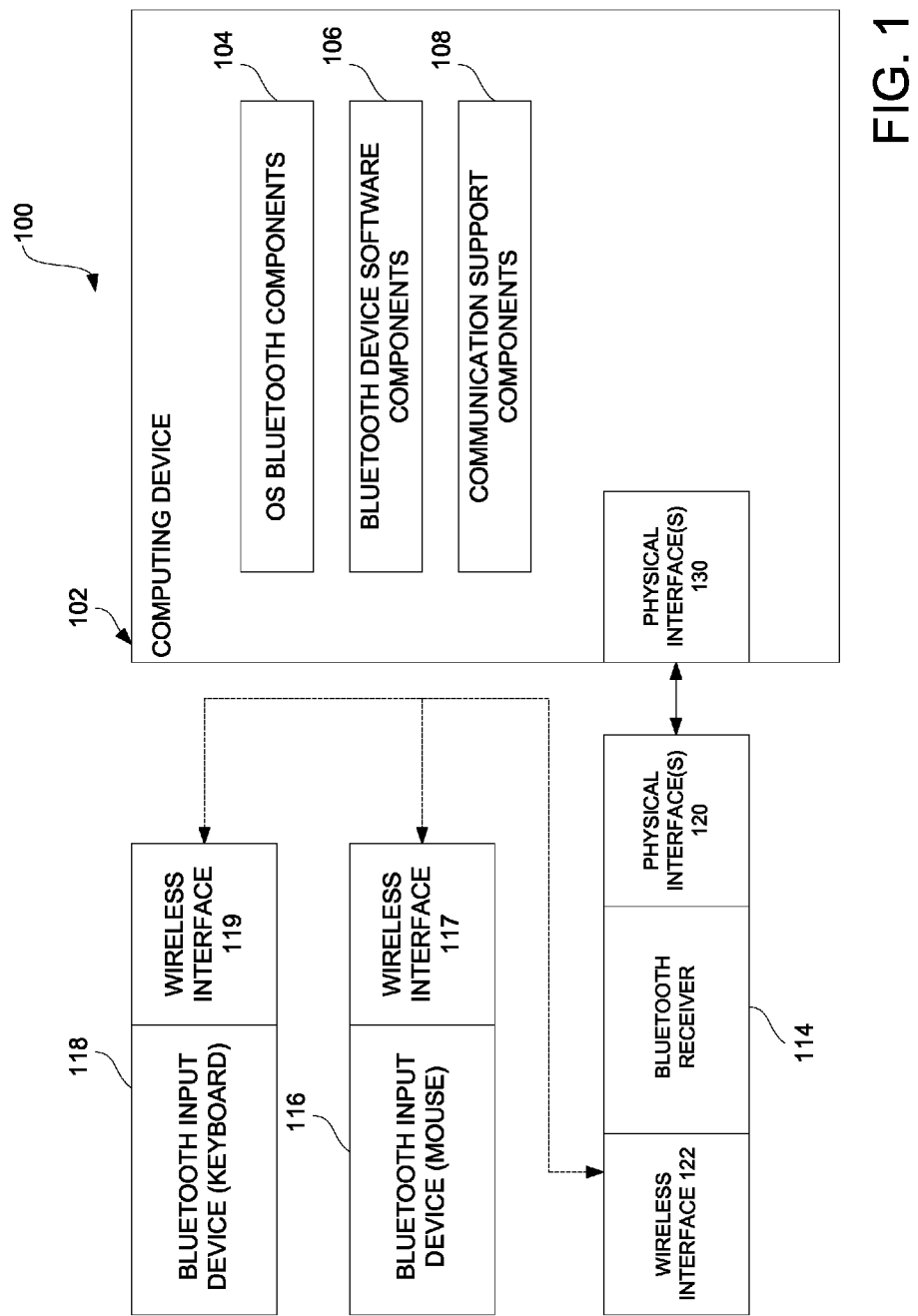

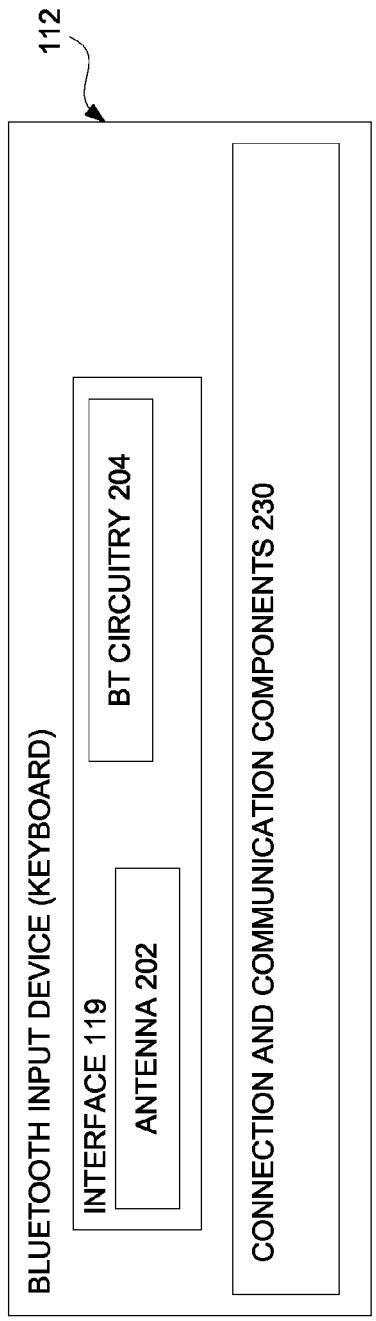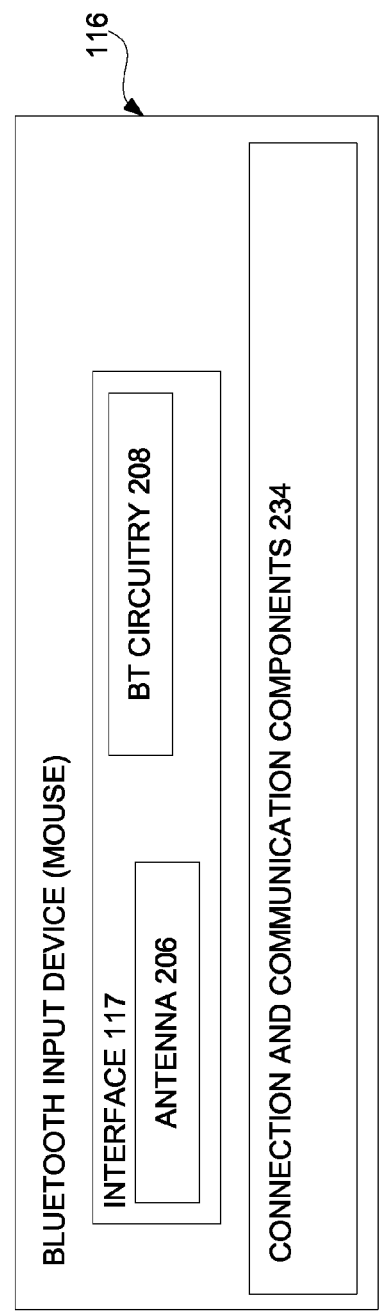

SYSTEMS AND METHODS FOR PAIRING BLUETOOTH DEVICES

CROSS-REFERENCE TO RELATED APPLICATION

The present application is a continuation of and claims priority of U.S. patent application Ser. No. 13/486,251, filed Jun. 1, 2012, which is a continuation of and claims priority of U.S. patent application Ser. No. 11/732,980, filed Apr. 5, 2007. The contents of these applications are hereby incorporated by reference in their entirety.

BACKGROUND

Current schemes for initially pairing Bluetooth input devices and/or reconnecting upon a connection interruption are not, from the perspective of a user, particularly convenient. For example, pairing and reconnecting commonly require a second working mouse and keyboard in order to log in and run through associated user interface components. In many cases, the user interface components are relatively tedious, often requiring the user to enter a personal identification number. Even when a connection is established, the ensuing wireless communication can be less than reliable. In some cases, after a power cycle and log in, machine settings are somehow modified and the machine becomes incorrectly configured for the Bluetooth input devices it expects.

Further, current schemes for initially pairing Bluetooth input devices and/or reconnecting upon a connection interruption are not particularly secure. For example, for devices that are not authenticated, often times a mouse device, there is an opportunity for spoofing the device during the connection process and taking control of the machine.

The discussion above is merely provided for general background information and is not intended to be used as an aid in determining the scope of the claimed subject matter.

SUMMARY

Embodiments of software-supervised pairing processes are provided. The processes enable a user to pair a mouse and keyboard with a Bluetooth transceiver without having to use a second mouse and keyboard. At least two separate processes are provided, including a long transition for initial pairing or re-pairing and a short transition for re-establishing a connection after devices have already been paired.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 1 is a schematic diagram of a computing system.

FIGS. 2A, 2B and 2C are schematic representations of components of the computing system.

DETAILED DESCRIPTION

Figure 2C:
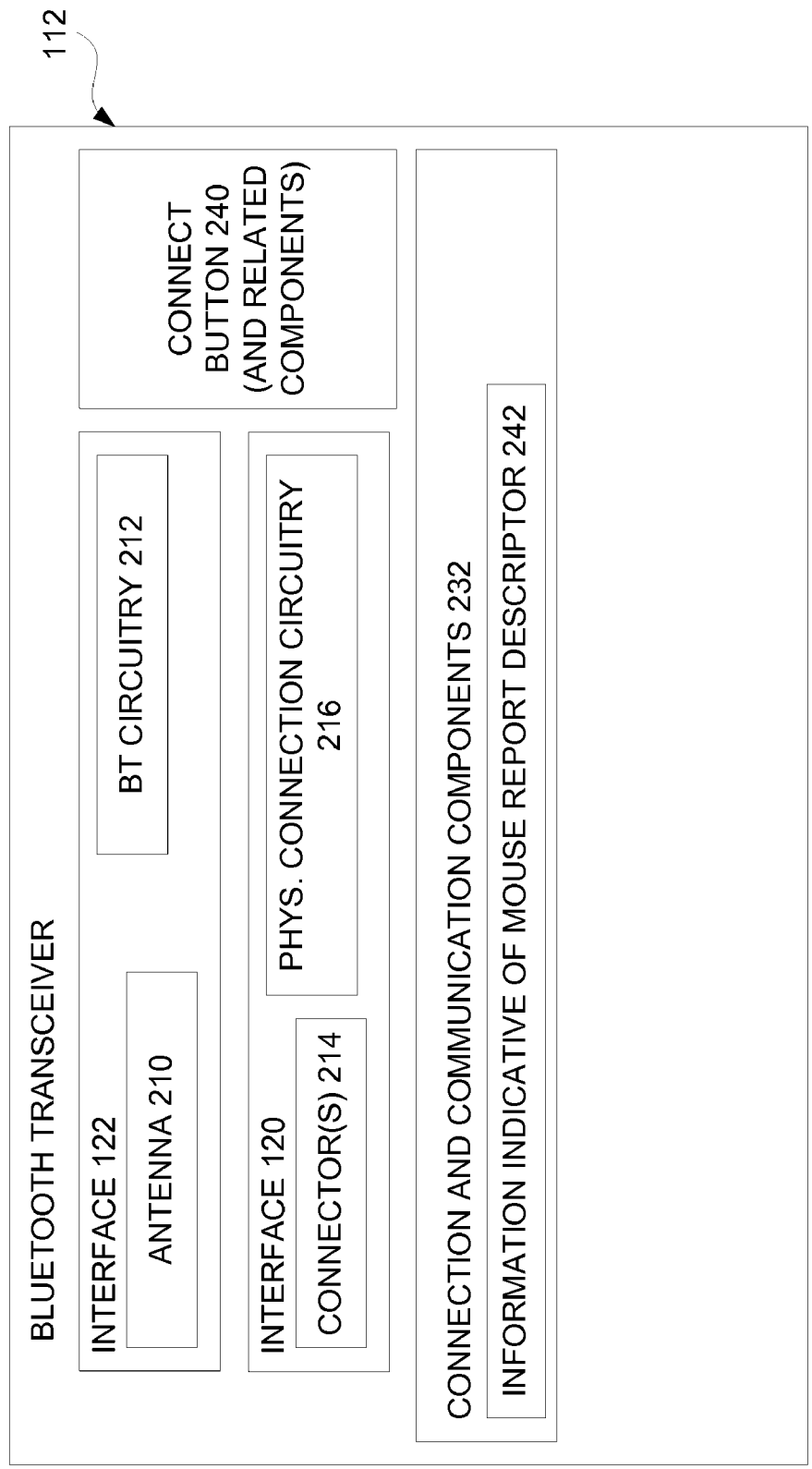

FIG. 1 is a schematic diagram of a computing system 100. System 100 includes an input device 116 and an input device 118 that are each input tools utilized by a user to enter commands relative to a computing device 102. It is to be noted; however, that the present invention is not necessarily limited to input devices. It is within the scope of the present invention for other types of devices to be configured to employ and utilize the same or similar connection and communication schemes as will be described herein. The concept of an input device is provided simply as a specific example for the purpose of illustrating concepts associated with embodiments of the present invention.

In one embodiment, not by limitation, input device 118 is a keyboard and input device 116 is a mouse. It should be noted; however, that the scope of the present invention is not limited to having more than one device, and is also not limited to a keyboard and/or a mouse. The concept of a keyboard and mouse are provided simply as specific examples for the purpose of illustrating concepts associated with embodiments of the present invention.

Devices 116 and 118 are illustratively equipped with wireless interfaces 117 and 119, respectively. Interfaces 117 and 119 are configured to support Bluetooth wireless communication with computing device 102 facilitated by a Bluetooth transceiver 114. Transceiver 114 is equipped with a wireless interface 122, for supporting communication with devices 116 and 118 by way of interfaces 117 and 119.

Those skilled in the art will understand that Bluetooth wireless technology is an emerging standard for low-power, short range wireless radio communication. The technology allows multiple types of devices to communicate together wirelessly, even when the communicating devices are not within line-of-sight of one another. Bluetooth technology provides a relatively high transmission rate. For privacy and security purposes, the technology implements advanced error-correction methods, as well as encryption and authentication routines.

In one embodiment of a Bluetooth implementation, the radios operate in an unlicensed Instrumentation-Scientific-Medical (ISM) band at around 2.4 GHz (more specifically, but still approximately, 2.4-2.4835 GHz). Both point-to-point and point-to-multipoint connections are supported. The operating range is approximately 100 feet, but operation in some systems extends up to 1000 feet or more. The baseband protocol is a combination of circuit and packet switching. Channel time slots are approximately 625 microseconds long. The radio uses a channel hopping mechanism that hops at approximately 1600 hopes/sec. The concept of a Bluetooth device is provided simply as a specific example for the purpose of illustrating concepts associated with embodiments of the present invention. Without departing from the scope of the present invention, the pairing and connection schemes described herein could be applied in the context of devices configured for other types of communication.

Transceiver 114 is also equipped with a physical interface 120 for supporting communication with computing device 102 by way of a physical interface 130. The communicative relationship between interfaces 120 and 130 is illustratively facilitated by a physical connection between physical connectors, for example, one connector associated with transceiver 114 and a corresponding complimentary connector associated with computing device 102. In one embodiment, not by limitation, this means an engagement between corresponding USB or PS2 connectors. However, in one embodiment, the communicative relationship is facilitated by a physical connection between more than one physical connector associated with transceiver 114 and more than one corresponding complimentary connectors associated with computing device 102. For example, at least one PS2 connector and a USB connector associated with transceiver 114 might engage to corresponding complimentary connectors associated with computing device 102. Those skilled in the art will appreciate that the precise means of physical communication, which may or may not be USB- or PS2-based, can vary from one implementation to the next without departing from the scope of the present invention.

FIGS. 2A, 2B and 2C are more detailed schematic representations of keyboard device 118, mouse device 116 and transceiver 114. As is shown in FIG. 2A, interface 119 includes components necessary to support the described Bluetooth wireless communication, namely, but not necessarily limited to, an antenna 202 and Bluetooth circuitry 204. As is shown in FIG. 2B, interface 117 includes components necessary to support the described Bluetooth wireless communication, namely, but not necessarily limited to, an antenna 206 and Bluetooth circuitry 208. As is shown in FIG. 2C, interface 122 includes components necessary to support the described Bluetooth wireless communication, namely, but not necessarily limited to, an antenna 210 and Bluetooth circuitry 212. As is also shown in FIG. 2C, interface 120 includes components necessary to support the described physical communication, namely, but not necessarily limited to, a connector or connectors 214 and corresponding circuitry 126.

A number of components are operatively installed on computing device 102 for the purpose of supporting the functionality of devices 116 and 118. These components include operating system Bluetooth components 104, Bluetooth device software components 106 and communication support components 108.

Components 104 represent Bluetooth components that are associated with (e.g., native to) an operating system implemented on computing device 102. Components 104 illustratively include user interface components for walking a user through a process for setting up (e.g., pairing) a Bluetooth device for operation with computing device 102. Components 104 illustratively include APIs that can be leveraged for a wide variety of different Bluetooth-related functions. The precise nature of components 104 may vary from one operating system to the next, or even from one version of an operating system to the next.

Communication support components 108 are generally the components that enable computing device 102 to communicate through all enabled paths of communication. For example, components 108 include the components necessary to support communication through physical interface(s) 130. Components 108 also illustratively include the components necessary to support various types of enabled wireless communication with device 102.

Bluetooth device software components 106 are illustratively components configured and installed for the specific purpose of supporting connection and communication with device 116 and/or 118 by way of transceiver 114. Transceiver 114 and keyboard 118 are configured with connection and communication components 232 and 230, respectively. Components 232 and 230 are configured to operate in conjunction with device software components 106 to provide a hardware-software solution. The solution enables the user to easily and securely set up Bluetooth devices 116 and 118 without the need for a second keyboard and without having to manually run through a wizard or other similar setup routine associated with operating system components 104.

In one embodiment, as will be described in greater detail below, transceiver 114, mouse 116 and/or keyboard 118 are provided in a matched set and pre-paired to some extent (e.g., pre-paired at the factory or otherwise before being provided to an end consumer). In one embodiment mouse 116 and/or keyboard 118 are provided in a default mode (e.g., a non-Bluetooth mode) that enables them to behave like a USB mouse and keyboard, so that the user can control the BIOS of computing device 102 in order to log in without having to do any Bluetooth pairing. As will also be described in detail, components 230, 232 and/or 234 illustratively support a set of feature reports that enable an automation of the Bluetooth pairing process.

Bluetooth device software components 106 are illustratively configured to manage the process of paring Bluetooth devices 118 and 116 for connection and communication with computing device 102. This pairing process will be referred to herein as a "long transition." The long transition enables devices 116 and 118 to be paired with transceiver 114 without having to use a second mouse and keyboard and without having to manually run through a wizard or other similar setup routine associated with operating system components 104.

Figure 3:
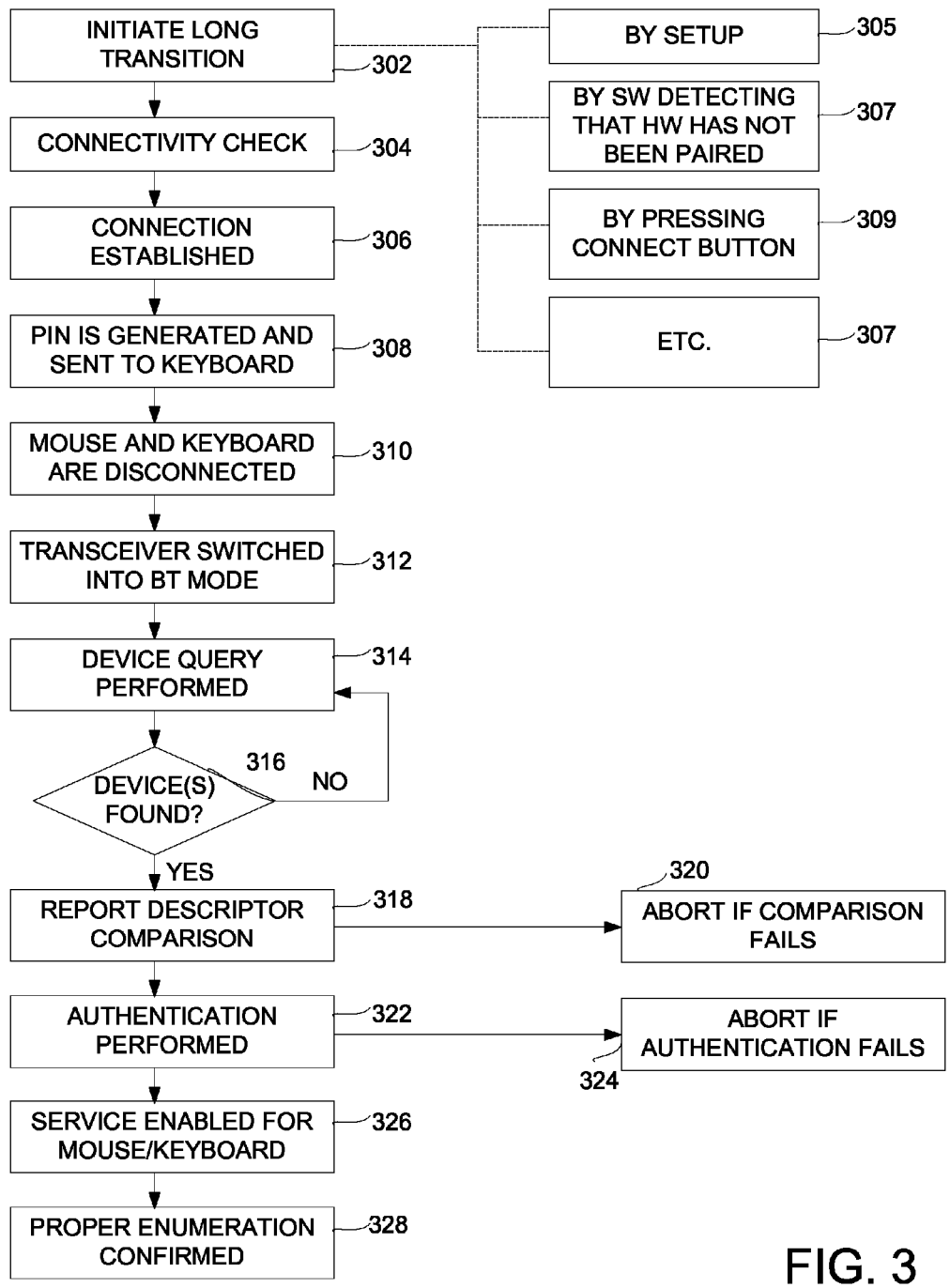
FIG. 3 is a flow chart diagram demonstrating steps associated with a long transition.

FIG. 3 is a flow chart diagram demonstrating steps associated with the long transition. It is assumed that transceiver 114 is physically and functionally engaged to computing device 102 (i.e., through an engagement of interfaces 120 and 130). It is also assumed that devices 116 and 118 are in close enough proximity to support connections for wireless communication as described herein.

In accordance with block 302, the long transition is first initiated. There are a variety of different ways in which this might occur. A few different ways are shown specifically in FIG. 3. In accordance with block 305, initiation occurs as part of a setup process. In accordance with block 307, initiation occurs when a software component installed on computing device 102 (e.g., a function of components 104 and/or 106) detects that the hardware components have not been paired.

In accordance with block 309, initiation occurs when a connect button located on device 118, 116 and/or transceiver 114 is pressed. In one embodiment, transceiver 114 is configured with such a button (shown in FIG. 2C as components 240) that a user can press at any time to try to restore a communication connection. In one embodiment, software components 106 are configured to detect a pressing of the transceiver button and respond by automatically launching software components in order to guide the user through the long transition process. Thus, the user is able to establish or re-establish a connection without the use of a separate mouse and/or keyboard.

As is indicated by block 311, the present invention contemplates other methods for initiating the long transition process. A few specific examples have been provided not by limitation but to illustrate that there are several different alternatives. Those skilled in the art will appreciate that there are other alternatives within the scope of the present invention.

In accordance with block 304, the long transition begins with a connectivity check. In one embodiment of a connectivity check, software 106 checks for connectivity between transceiver 114 and the mouse/keyboard. In one embodiment, if there is no connection, the user is instructed to press connect buttons (not shown in FIGS. 2A and 2B) the mouse and keyboard, which illustratively will cause a connection to be established. Regardless of whether pre-existing or newly initiated, establishment of a connection is designated by block 306. Those skilled in the art will appreciate that step 304 is optional if it is otherwise determined that a connection has been established.

In accordance with block 308, a PIN is generated (e.g., a random PIN) and sent to keyboard 118. In one embodiment, it is software 106 that handles these functions. The purpose of this PIN step is to increase security, and also to relieve the user of the burden of generating and/or entering a PIN. In one embodiment, software 106 automatically generates (e.g., randomly) a PIN during each long transition and sends it to the keyboard, for example, but not by limitation, as part of an HID feature report. It should be noted that it is within the scope of the present invention for the PIN code to be otherwise obtained. For example, in one embodiment, the PIN code is prebound at the factory.

In accordance with block 310, a command is sent to transceiver 114 (e.g., sent by software 106) instructing the transceiver to disconnect the mouse and keyboard, thus placing them into a discoverable mode. In accordance with block 312, a command is sent to transceiver 114 (e.g., sent by software 106) instructing the transceiver to place itself into Bluetooth mode.

In accordance with block 314, a command is sent to transceiver 114 instructing the transceiver to facilitate a device inquiry. In one embodiment, software 106 issues this command by way of an existing API associated with operating system components 104. Thus, in one embodiment, operating system components 104 are not utilized until it is time for the device query to be performed. In accordance with block 316, the device query is repeated one or more times until the Bluetooth device (or devices) is found.

In accordance with block 318, commands are issued in order to retrieve an SDP record from the mouse. The report descriptor is extracted and compared to a known correct mouse report descriptor. In one embodiment, as is shown in FIG. 2C, the known correct report descriptor is stored within transceiver 114. In one embodiment, software 106 is configured to retrieve the report descriptor records and perform the comparison. If there is no match, then, in accordance with block 320, the process is aborted. Steps 318 and 320 are illustratively optional steps but implementing them is advantageous in that it provides an increased level of security.

Because pairing may be done with a device (especially a mouse) that does not support Bluetooth authentication, it is desirable to ensure pairing is not being done to a rogue device impersonating the factory-paired mouse. To this end, as has been described, the HID report descriptor of the factory-paired mouse is illustratively programmed into the transceiver. Then, as has also been described, during the long transition, the report description retrieved from the mouse SDP record is compared to the report descriptor retrieved from the transceiver, and pairing is aborted if they do not. In one embodiment, as an alternative to retrieving the report descriptor from the transceiver, it is hard-coded in software 106, for example, based on the VID and PID of the device. Those skilled in the art will appreciate that this and other alternatives are contemplated and should be considered within the scope of the present invention. Further, it is to be understood that this device verification process is optional. If a device supports security (e.g., a device that supports pairing security through user-entry of a code), then the verification process may be unnecessary and can, in one embodiment, be omitted. It is within the scope to omit the verification process for any reason.

In accordance with block 322, an authentication process is performed and, if it fails, then accordance with block 324, the pairing process is aborted. In one embodiment, the authentication is an authentication based on the PIN previously transmitted to the keyboard. In one embodiment, software 106 is configured to, for purposes of the authentication process, utilize an existing operating system component 104 to cause the authentication to be performed with the keyboard based on the PIN previously generated and transmitted (i.e., by the software 106).

Assuming proper authentication, in accordance with block 326, HID services are enabled for the mouse and keyboard. In one embodiment, this means software 106 utilizing an existing operating system component 104 to enable the services. Finally in accordance with block 328, software 106 waits for, and ensures that, the devices enumerate properly. If not, corrective means are illustratively initiated based on the nature of the exception.

In one embodiment, software 106 is configured to manage the long transition process independent of operating system components 104 except where software 106 leverages an existing operating system API to perform a particular function. For example, as has been noted, an operating system component might be leveraged, as has been described, to initiate and/or perform a device inquiry, initiate and/or conduct a PIN authentication, and/or enable services for the keyboard and mouse. Of course, it is within the scope of the present invention for software components 106 to be configured to handle these functions instead.

It should be noted that many of the operations performed during the long transition may be unreliable, for example, due to the somewhat unreliable nature of wireless communication. Therefore, in one embodiment, software 106 is configured to, if a failure is encountered, retry operations such as sending of the PIN to the keyboard, performing a Bluetooth inquiry, retrieving an SDP record from the mouse, authenticating the keyboard, enabling the HID services, etc. Block 316 is but one example of where a step can be repeated until successful. In one embodiment, a limit is place on how many times a given step is repeated before a total failure is declared and the process is aborted.

In one embodiment, in addition to the long transition, there is also something called a short transition. A short transition is illustratively initiated when the total long transition process is unnecessary. For example, when transceiver 114 is reset for example, but not by limitation, due to a reboot or hotplug, it illustratively starts out in the non-Bluetooth mode of communication. Software 106 illustratively detects this condition and performs a short transition.

Figure 4:
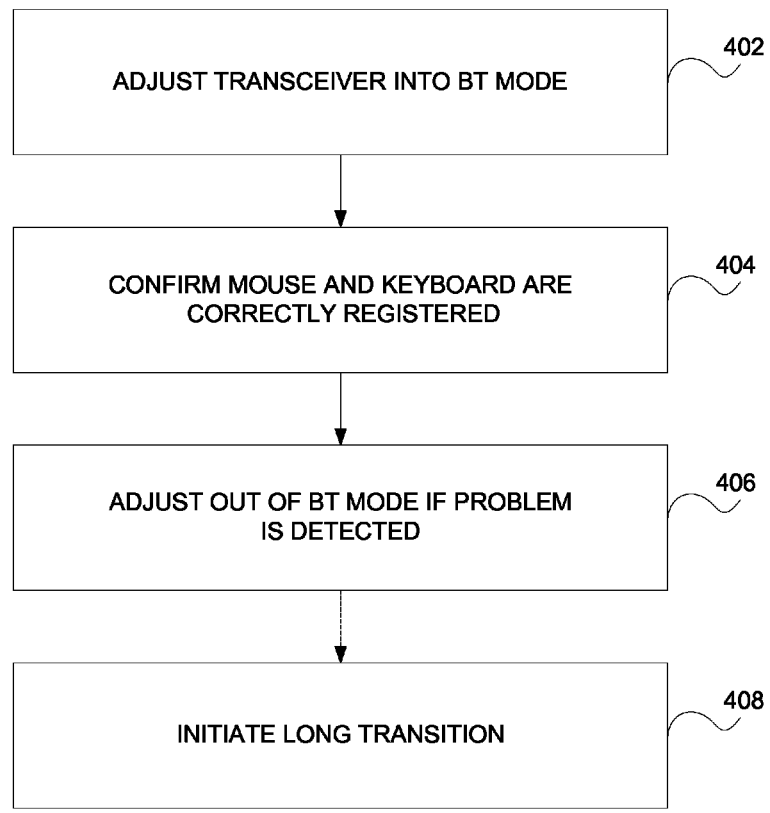
FIG. 4 is a flow chart diagram demonstrating steps associated with a short transition.

FIG. 4 is a block flow diagram demonstrating steps associated with conducting a short transition. In accordance with block 402, transceiver 114 is switched into the Bluetooth mode of communication. In one embodiment, this means that a command is sent from software 106 to transceiver 114 instructing adjustment into the Bluetooth mode. This command is executed by the transceiver.

In accordance with step 404, a check is made to confirm that the mouse and keyboard are properly registered and operational. In one embodiment, this means that software 106 utilizes an existing operating system API 104 to ensure that the mouse and keyboard are correctly registered in the operating system Bluetooth stack. In accordance with block 406, if a problem is detected, the transceiver is switched (e.g., by software 106) back into the non-Bluetooth mode of operation. If this occurs, in one optional embodiment, in accordance with block 408, a long transition is initiated. This process ensures that the user is not left without a mouse and keyboard if there is a problem with the pairing in Bluetooth mode.

Thus, the present invention provides a hardware-software solution that enables a keyboard and/or mouse to present itself to a target host computer as non-Bluetooth device (e.g., a USB device), thereby enabling emulation of a wired connection. In this alternate mode of communication, the transceiver and devices are still communicating using standard Bluetooth wireless communication. However, translation is conducted such that, from the computer's perspective, it is not known that there is a Bluetooth radio behind the originating device. The software configured to support the device does know that Bluetooth is part of the equation because the software is familiar with the devices itself. The software is then configured to facilitate a long or short transition in order to engage a Bluetooth mode of operation.

Figure 5:
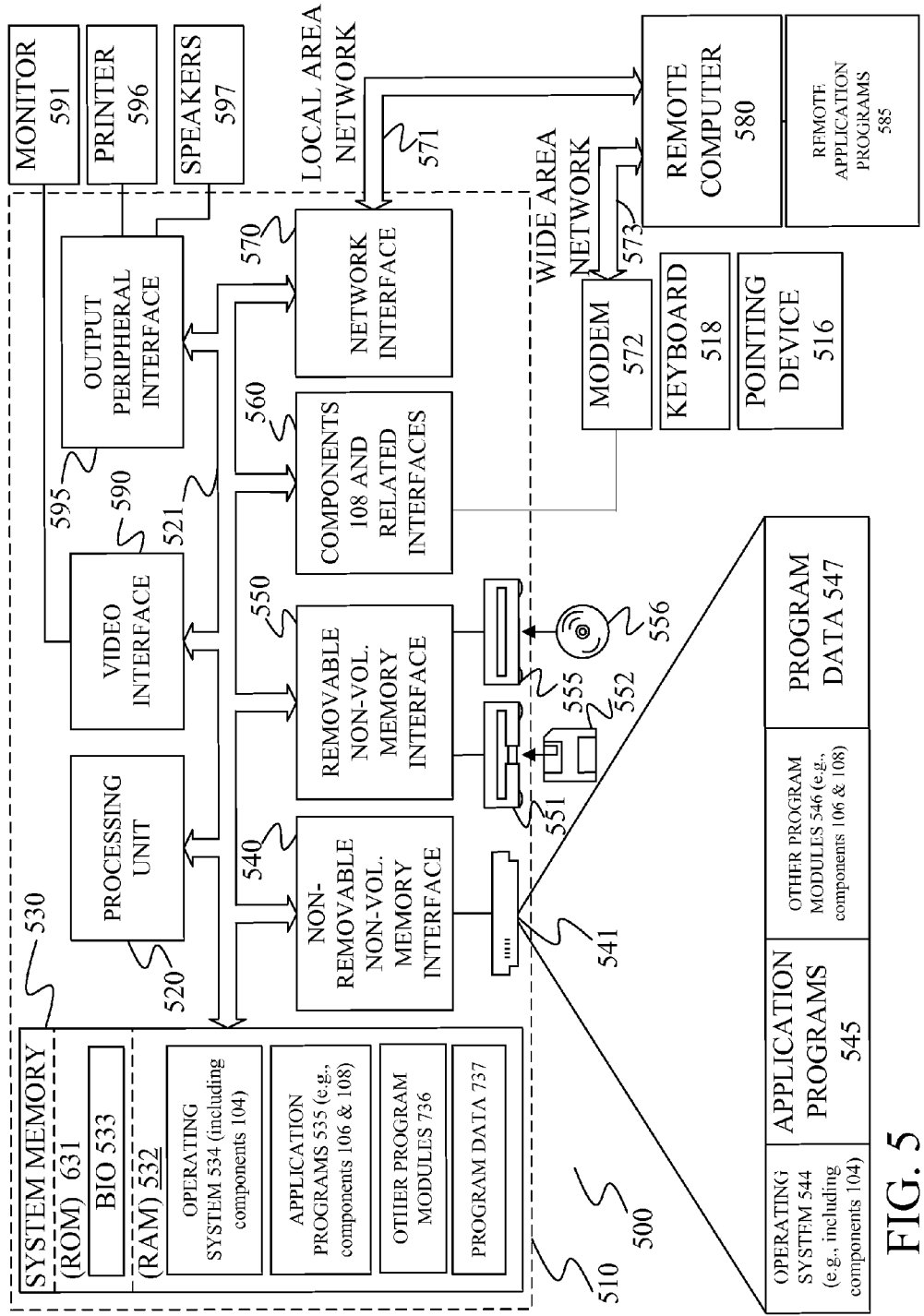
FIG. 5 is an example of a computing system environment.

FIG. 5 illustrates an example of a suitable computing system environment 500 in which embodiments may be implemented. The computing system environment 500 is only one example of a suitable computing environment and is not intended to suggest any limitation as to the scope of use or functionality of the claimed subject matter. Neither should the computing environment 500 be interpreted as having any dependency or requirement relating to any one or combination of components illustrated in the exemplary operating environment 500.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 5, an exemplary system for implementing some embodiments includes a general-purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537. As is indicated, operating system 534 illustratively includes operating system Bluetooth Components 104, and programs 535 include Bluetooth device software components 106 and/or communication support component 108. This need not necessarily be the case. This is just an example of how embodiments of the present invention might be implemented in environment 500.

The computer 510 may also include other removable/non-removable volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 751 and optical disk drive 555 are typically connected to the system bus 521 by a removable memory interface, such as interface 550.

The drives, and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. As is indicated, operating system 544 can include components 104, and program modules 546 can include components 108 and/or 108. This need not necessarily be the case. This is just an example of how embodiments of the present invention might be implemented in environment 500.

A user may enter commands and information into the computer 510 through input devices such as keyboard 118 and pointing device 116, which could actually be a mouse, trackball, touch pad or some other device. Other input devices (not shown) may include a joystick, game pad, satellite dish, scanner, or the like. Any of these or other devices can be connected and operated in accordance with embodiments of connection and operation described herein. These and other input devices are often connected to the processing unit 520 through a user input interface, which is illustratively identified as communication support components 108 and related interfaces, which illustratively include support for wireless communication, including Bluetooth wireless communication. Certainly other interface and bus structures can be implemented, such as a parallel port, game port or a universal serial bus (USB), to accommodate other devices. Transceiver 114 is not shown in FIG. 7, but it would be connected to components 108 and a related interface, as well.

A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 is operated in a networked environment using logical connections to one or more remote computers, such as a remote computer 580. The remote computer 580 may be a personal computer, a hand-held device, a server, a router, a network PC, a peer device or other common network node, and typically includes many or all of the elements described above relative to the computer 510. The logical connections depicted in FIG. 5 include a local area network (LAN) 571 and a wide area network (WAN) 573, but may also include other networks. Such networking environments are commonplace in offices, enterprise-wide computer networks, intranets and the Internet. In one embodiment, software components 106 are downloaded from remote computer 780 into computer 510, but they may certainly be otherwise acquired, such as from a storage medium like disk 756, or otherwise acquired.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via components 108, or another appropriate mechanism. In a networked environment, program modules depicted relative to the computer 510, or portions thereof, may be stored in the remote memory storage device. By way of example, and not limitation, FIG. 5 illustrates remote application programs 585 as residing on remote computer 580. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    providing a code value, to a device, using a first wireless mode of communication;
    receiving an authentication value, from the device, using a second wireless mode of communication that is different the first wireless mode of communication; and
    authenticating the device by evaluating a relationship between the authentication value and the code value, using a processor.

2. The method of claim 1, and further comprising:
    limiting a functionality of the device based on a determination that the authentication value does not properly correspond to the code value.

3. The method of claim 1, wherein the device is authenticated based on a determination that the authentication value matches the code value.

4. The method of claim 1, wherein providing a code value further comprises providing an automatically generated code value.

5. The method of claim wherein providing comprises:
    providing the code value through a transceiver with which the device is configured to support wireless communication.

6. The method of claim 5, wherein the transceiver has a wireless interface to the device and a wired interface to a computer.

7. The method of wherein at east one of the first and second communication modes is a Bluetooth wireless communication mode.

8. The method of claim 1, further comprising re-providing the code value to re-authenticate the device.

9. The method of claim 1, wherein the device comprises a keyboard.

10. The method of claim 9, wherein authenticating the device never requires a user to input the authentication value or the code value into the keyboard.

11. The method of claim 1, wherein the device comprises a pointing device.

12. The method of claim 1, wherein the first mode of communication is a simulated wired mode.

13. The method of claim 12, wherein, when in the first mode of communication, at least some of the communications are translated so as to be consistent with a wired communication protocol.

14. A device comprising:
    a wireless communication interface; and
    connection and communication components configured to facilitate communication between the device and a computing device, by wirelessly receiving a code value using a first mode of communication, determining an authentication value based on the code value, and wirelessly sending the authentication value using a second mode of communication, wherein the device is authenticated with the computing device based on the authentication value.

15. The device of claim 14, wherein functionality of the device is limited based on the authentication value.

16. The device of claim 14, wherein the authentication value is determined based on a report descriptor associated with the device.

17. A method comprising:
wirelessly providing a code value to a wireless device using a transceiver in a first mode of communication, wherein the transceiver communicates with a computing device through a physical interface;
switching the transceiver from the first mode of communication to a second mode of communication; and
wirelessly receiving an authentication value from the wireless device using the transceiver in the second mode of communication, wherein the wireless device is authenticated with the computing device based on the authentication value.

18. The method of claim 17, wherein the transceiver is removably coupled to the computing device using corresponding connectors on the transceiver and the computing device, and further comprising:
providing the code value from the computing device to the transceiver through the physical interface; and
providing the authentication value from the transceiver to the computing device through the physical interface, wherein the computing device authenticates the wireless device based on the authentication value and the code value.

19. The method of claim 17, wherein, when in the first mode, communication between the wireless device and the transceiver simulates a wired communication mode.

20. The method of claim 19, wherein, when in the first mode, at least some of the communications between the wireless device and the transceiver are translated so as to be consistent with a wired communication protocol.

* * * * *